(12) United States Patent
Zhu et al.

(10) Patent No.: US 10,031,532 B2
(45) Date of Patent: Jul. 24, 2018

(54) PRESSURE BALANCE VALVE OF INTERNAL RETENTION STRUCTURE

(71) Applicant: Xiamen Lota International Co., Ltd., Xiamen (CN)

(72) Inventors: Chuanbao Zhu, Xiamen (CN); Keping Li, Xiamen (CN); Canzhong Zeng, Xiamen (CN)

(73) Assignee: XIAMEN LOTA INTERNATIONAL CO., LTD., Xiamen, Fujian (CN)

( * ) Notice: Subject to any disclaimer, the term of this patent is extended or adjusted under 35 U.S.C. 154(b) by 14 days.

(21) Appl. No.: 15/259,042

(22) Filed: Sep. 7, 2016

(65) Prior Publication Data

US 2017/0220054 A1  Aug. 3, 2017

(30) Foreign Application Priority Data

Jan. 28, 2016  (CN) .......................... 2016 1 0057963

(51) Int. Cl.
*G05D 23/13* (2006.01)
*G05D 16/10* (2006.01)
*E03C 1/02* (2006.01)
*F16K 11/085* (2006.01)
*F16K 11/00* (2006.01)
*F16K 11/078* (2006.01)

(52) U.S. Cl.
CPC ....... *G05D 16/106* (2013.01); *G05D 23/1313* (2013.01); *E03C 2001/026* (2013.01); *F16K 11/00* (2013.01); *F16K 11/0787* (2013.01); *F16K 11/085* (2013.01); *F16K 19/006* (2013.01); *G05D 23/13* (2013.01)

(58) Field of Classification Search
CPC .. G05D 23/1313; G05D 23/13; G05D 16/106; F16K 11/085; F16K 11/00; F16K 11/0787; F16K 19/006; E03C 2001/026
See application file for complete search history.

(56) References Cited

U.S. PATENT DOCUMENTS

| | | | | |
|---|---|---|---|---|
| 5,299,593 A | * | 4/1994 | Ottelli | G05D 23/1313 137/100 |
| 5,983,918 A | * | 11/1999 | Chang | G05D 23/1313 137/100 |
| 6,138,705 A | * | 10/2000 | Chen | G05D 23/1313 137/315.11 |
| 6,267,134 B1 | * | 7/2001 | Chen | G05D 23/1313 137/597 |

(Continued)

*Primary Examiner* — Matthew W Jellett
*Assistant Examiner* — Christopher Ballman
(74) *Attorney, Agent, or Firm* — Leong C. Lei

(57) ABSTRACT

A pressure balance valve of an internal retention structure includes a control head, a valve housing, a balance valve assembly, and a valve seat assembly. The balance valve assembly includes a balance valve body, a piston, and sealing elements. The valve seat assembly includes a valve seat, two water stop sleeves, and a plug cap. The valve seat is integrally formed with a valve core chamber receiving therein balance valve assembly and closed by the plug cap. The valve seat assembly forms sealed and movable engagement with the control head by means of the water stop sleeves. Positioning between the valve core the valve seat and the valve housing can be made more accurate and more reliable and sealing performance of the valve core is improved.

20 Claims, 4 Drawing Sheets

(56) References Cited

U.S. PATENT DOCUMENTS

| | | | | |
|---|---|---|---|---|
| 7,363,934 B1 * | 4/2008 | Lin | ............... | F16K 11/074 137/315.13 |
| 8,267,111 B2 * | 9/2012 | Yang | ............ | G05D 23/1313 137/100 |
| 8,707,995 B2 * | 4/2014 | Yan | ............ | F15D 1/04 137/100 |
| 2005/0126648 A1 * | 6/2005 | Vu | ............ | E03C 1/04 137/625.41 |
| 2010/0058534 A1 * | 3/2010 | Martin | ............ | F16K 11/0787 4/677 |
| 2013/0087231 A1 * | 4/2013 | Tung | ............ | F16K 11/048 137/606 |
| 2013/0087232 A1 * | 4/2013 | Tung | ............ | F16K 11/048 137/625.17 |
| 2013/0199632 A1 * | 8/2013 | Law | ............ | F16K 11/044 137/511 |
| 2014/0124046 A1 * | 5/2014 | Tung | ............ | G05D 23/1313 137/98 |
| 2015/0014423 A1 * | 1/2015 | Yang | ............ | G05D 16/103 236/91 R |
| 2016/0083940 A1 * | 3/2016 | Wang | ............ | F16K 47/04 137/625.4 |
| 2016/0341325 A1 * | 11/2016 | Ye | ............ | F16K 19/006 |
| 2017/0168510 A1 * | 6/2017 | Ye | ............ | G05D 23/1313 |

* cited by examiner

PRESSURE BALANCE VALVE OF INTERNAL RETENTION STRUCTURE

TECHNICAL FIELD OF THE INVENTION

The present invention relates generally to a shower component assembly, and more particularly to a pressure balance valve of an internal retention structure.

DESCRIPTION OF THE PRIOR ART

Internal retention structures involving a pressure balance valve that are currently available in the market are configured such that the pressure balance valve generally comprises an upper valve seat and a lower valve seat that have, respectively, a bottom end face and a top end face, which are set in abutting engagement with each other to form a valve core chamber in which a balance valve assembly is received and carried. Such an arrangement increases the number of parts involved and may readily causes water leakage and air leakage occurring in the valve core if the dimensions and sizes of parts are not accurate and precise so as to greatly affect the performance of the pressure balance valve of the internal retention structures.

SUMMARY OF THE INVENTION

To overcome the above-discussed drawbacks of the prior art, an object of the present invention is to provide a pressure balance valve of an internal retention structure that features reliable positioning, good sealing property, and simple structure.

To achieve the above object, the present invention provides a solution as follows:

A pressure balance valve of n internal retention structure comprises a control head, a valve housing, a balance valve assembly, and a valve seat assembly. The balance valve assembly comprises a balance valve body, a piston, and sealing elements. The balance valve assembly is received in the valve seat assembly. The control head is mounted, in a direction from top to bottom, into and mates with the valve housing. The valve seat assembly is mounted into, in a direction from bottom to top, into and mates the valve housing. The valve seat assembly comprises a valve seat, two water stop sleeves, and a plug cap. The valve seat is integrally formed therein with a valve core chamber that receives and retains the balance valve assembly. The valve core chamber is formed with an opening formed in a side wall of the valve seat to receive entry of the balance valve assembly into the valve core chamber and closed with the plug cap. The valve core chamber is provided, on a top side thereof, with two water ingress openings for hot and cold water and is also provided, on a bottom side thereof, with two water introduction openings for hot and cold water. A columnar compartment is formed above each of the water ingress openings for receiving the water stop sleeves therein. The valve seat assembly forms a sealed and movable combination with the control head by means of the water stop sleeves.

The valve core chamber comprises a first circumferential wall, a second circumferential wall, and an intermediate circumferential wall. The first circumferential wall and the intermediate circumferential wall define a cold water introduction opening. The second circumferential wall and the intermediate circumferential wall define a hot water introduction opening. The cold and hot water introduction openings are each in communication with the valve core chamber.

The first circumferential wall forms, together with a side circumferential wall, a first annular stop. The second circumferential wall forms, together with a side circumferential wall, a second annular stop.

The first annular stop is in abutting engagement with an outer wall of the balance valve body and the second annular stop is in abutting engagement with an external end face of the plug cap.

The valve housing comprises a figure-8-shaped valve seat compartment formed therein. The valve seat compartment is provided, in a top side thereof, with a plurality of retention slots. The valve seat is provided, on an outer circumference of the columnar compartments, with a plurality of retention barbs engageable with the retention slots.

The valve housing is provided, in a bottom thereof, with two mixed water egress openings.

With the above technical solution, the present invention is structured such that the valve seat that comprises a hollowed interior (which forms the valve core chamber) and carries and supports the entirety of the balance valve assembly is provided for making positioning of the valve core more reliable and achieves engagement and combination with the control head through the arrangement of the columnar compartments for respectively receiving the water stop sleeves, whereby the sealing performance of the entire pressure balance valve can be improved and the structure and number of parts involved can be simplified and reduced and positioning accuracy between the valve housing and the valve seat can be further improved through sealing structures that are integrally formed with the valve seat so that sealing is made more reliable, allowing for easy and efficient performance of subsequent maintenance and replacement operations and thus ensuring the performance of the valve core and extending life span thereof.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
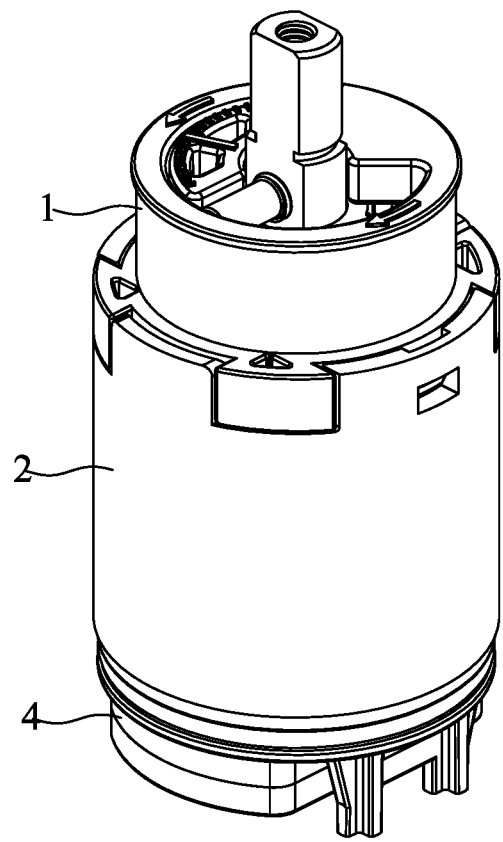
FIG. 1 is a perspective view of the present invention.
Figure 2:
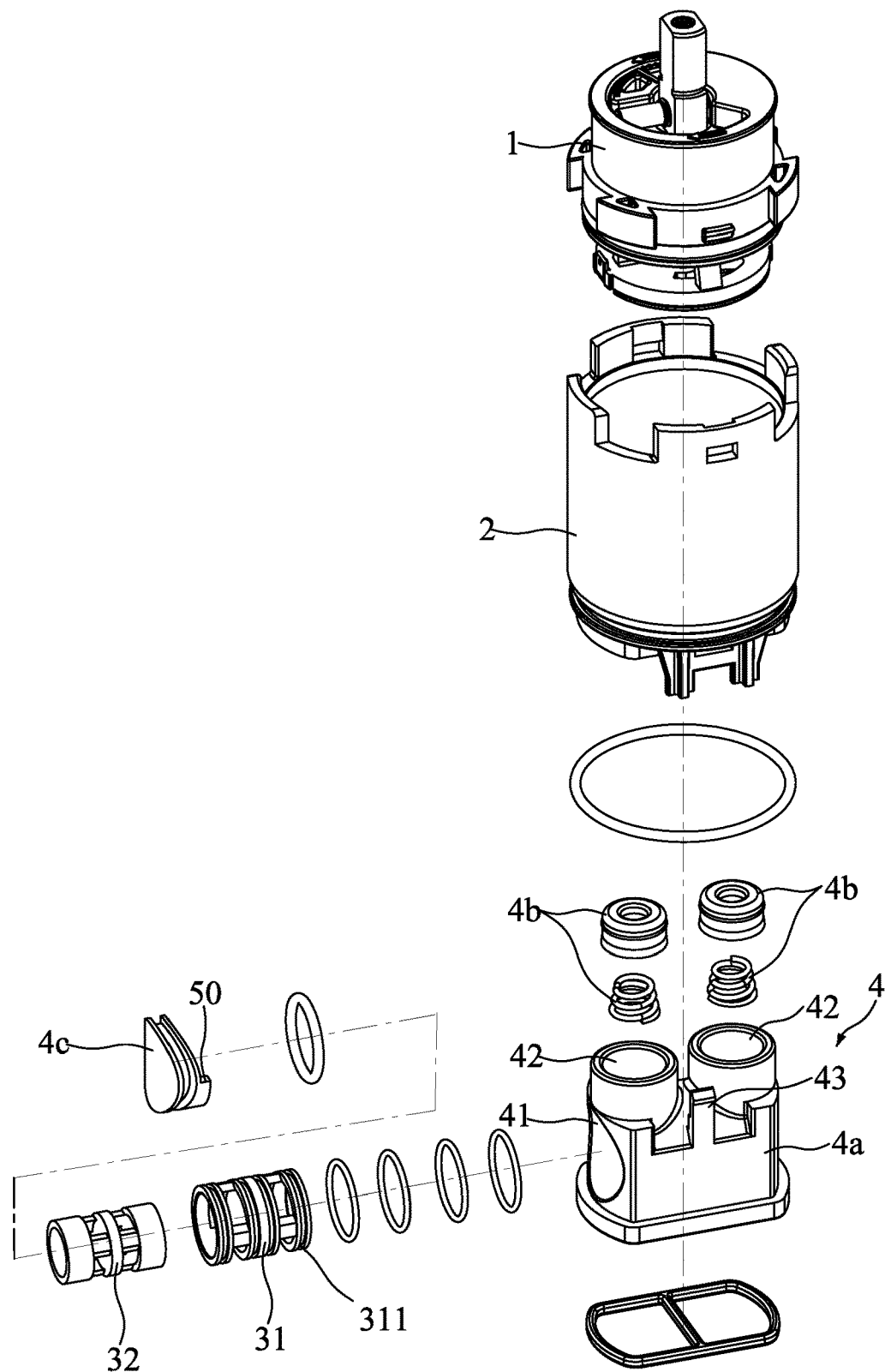
FIG. 2 is an exploded view of the present invention.
Figure 3:
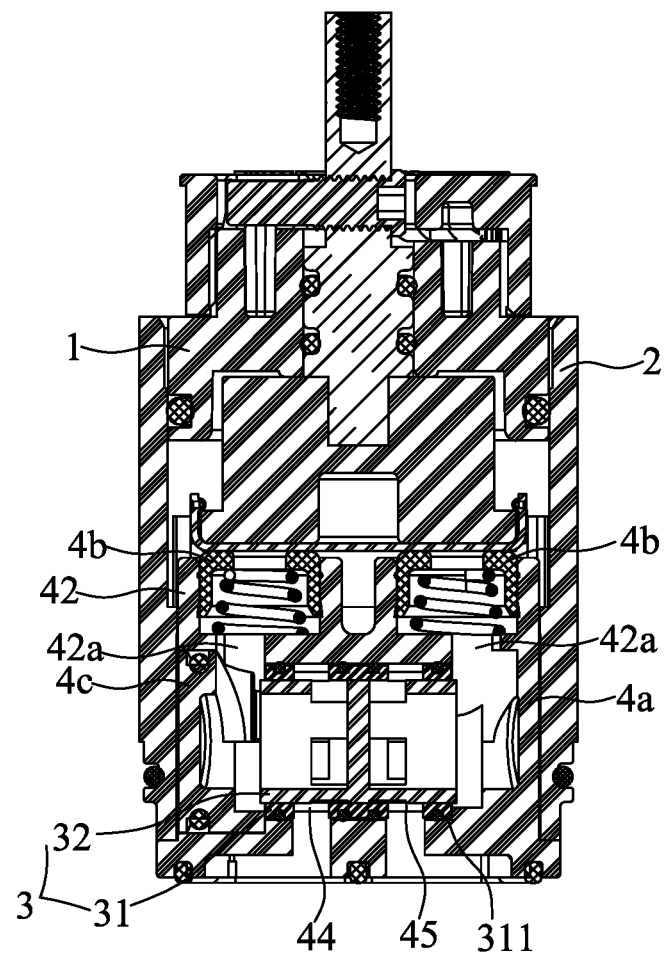
FIG. 3 is a cross-sectional view of the present invention in an assembled form.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

A detailed description of the present invention will be provided below with respect to the attached drawings and an embodiment thereof.

As shown in FIGS. 1-5, the present invention provides a pressure balance valve of an internal retention structure, which comprises: a control head 1, a valve housing 2, a balance valve assembly 3, and a valve seat assembly 4. The balance valve assembly 3 comprises a balance valve body 31, a piston 32, and sealing elements. The balance valve assembly 3 is received and mounted in the valve seat assembly 4. The control head 1 is mounted, in a direction from top side to bottom side, into the valve housing 2 through sealing mating engagement therebetween and the valve seat assembly 4 is mounted, in a direction from the bottom side to the top side, into and mates with the valve housing 2.

Features of the present invention are as follows. The valve seat assembly 4 comprises a valve seat 4a, two water stop sleeves 4b, and a plug cap 4c. The valve seat 4a is integrally formed therein with a valve core chamber 41 for receiving and accommodating the balance valve assembly 3. The valve core chamber 41 is formed with and in communication with an opening formed in a side wall of the valve seat 4a to receive entry of the balance valve assembly 3 into the valve core chamber 41 and closed with the plug cap 4c. Two water ingress openings 42a, for cold and hot water, are formed above the valve core chamber 41 and two water introduction openings, for cold and hot water, are formed below the valve core chamber. A columnar compartment 42 is formed above each of the water ingress openings 42a for receiving, in a mating manner, the water stop sleeves 4b therein. The valve seat assembly 4 is set in sealed but movable engagement with the control head 1 through the water stop sleeves 4b.

The present invention is structured such that the valve seat 4a that comprises a hollowed interior (which forms the valve core chamber 41) and carries and supports the entirety of the balance valve assembly is provided for making positioning of the valve core more reliable and achieves engagement and combination with the control head 1 through the arrangement of the columnar compartments 42 for respectively receiving the water stop sleeves 4b, whereby the sealing performance of the entire pressure balance valve can be improved and the structure and number of parts involved can be simplified and reduced and positioning accuracy between the valve housing 2 and the valve seat 4 can be further improved through sealing structures that are integrally formed with the valve seat 4a so that sealing is made more reliable, allowing for easy and efficient performance of subsequent maintenance and replacement operations and thus ensuring the performance of the valve core and extending life span thereof.

Figure 5:
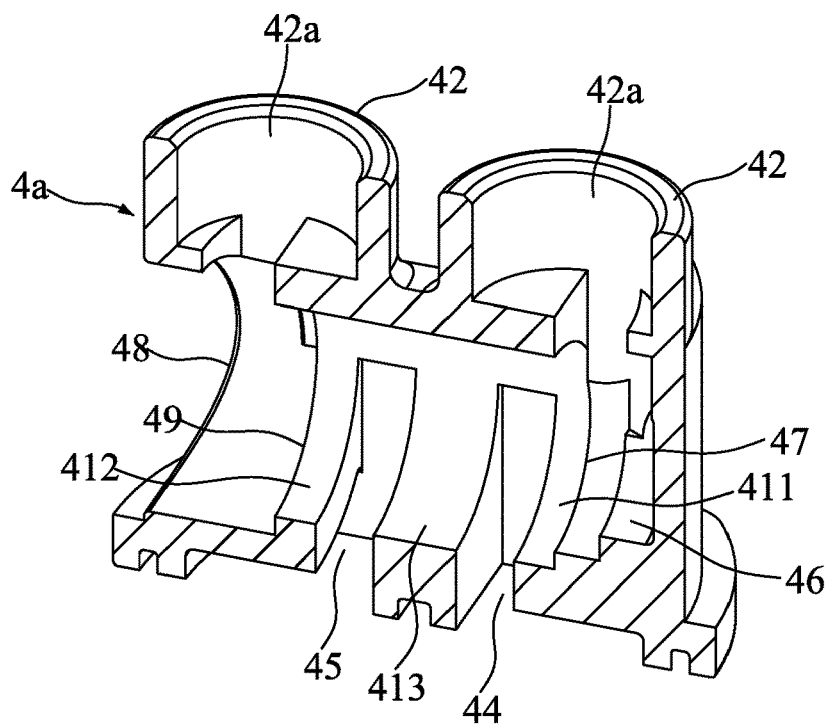
FIG. 5 is a perspective view, partly sectioned, of the valve housing of the present invention.

Referring to FIG. 5, the valve core chamber 41 comprises a first circumferential wall 411, a second circumferential wall 412, and an intermediate circumferential wall 413. The first circumferential wall 411 and the intermediate circumferential wall 413 define therebetween a cold water introduction opening 44, and the second circumferential wall 412 and the intermediate circumferential wall 413 define therebetween a hot water introduction opening 45. The two, cold and hot water introduction openings are each in communication with the valve core chamber 41.

Specifically, the first circumferential wall 411 forms, together with a side circumferential wall 46, a first annular stop 47, and the second circumferential wall 412 forms, together with a side circumferential wall 48, a second annular stop 49. The first annular stop 47 is arranged for receiving an outer wall 311 of and the balance valve body 31 to abut thereon and the second annular stop 49 is arranged to receive an external end face 50 of the plug cap 4c to abut thereon.

Figure 4:
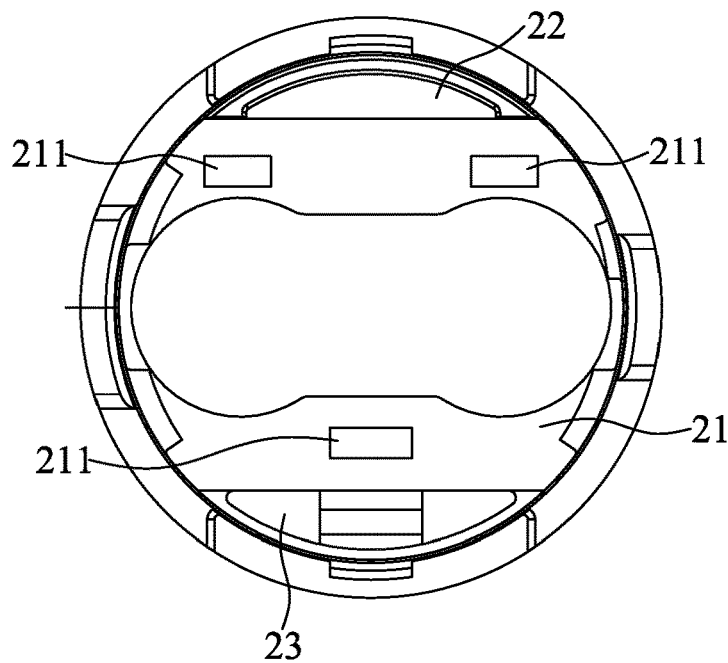
FIG. 4 is a top plan view of a valve housing of the present invention.

Referring to FIG. 4, the valve housing 2 is formed therein with a fiddle-shaped or a figure-8-shaped valve seat compartment 21. The valve seat compartment 21 is provided, in a top surface thereof, with a plurality of retention slots 211, and the valve seat 4a is provided, in an outer circumference of the columnar compartments 42, with a plurality of retention barbs 43, such that the valve seat assembly 4 uses the retention barbs 43 to engage the retention slots 211 of the valve housing 2 to achieve combination of the valve seat assembly 4 and the valve housing 2. Further, the valve housing 2 is provided in a bottom thereof with two mixed water egress openings 22, 23. Such a structure arrangement further eases assembling of the valve seat assembly 4.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A pressure balance valve comprising:
   a valve seat having two first cylindrical chambers therein arranged in parallel and extending in a vertical direction, configured to pass two respective liquids therethrough, and a second cylindrical chamber therein extending in a horizontal direction vertical to the vertical direction, wherein an opening at a sidewall of the valve seat is aligned in the horizontal direction with the second cylindrical chamber;
   a balance valve assembly coaxially received in the second cylindrical chamber, wherein the balance valve assembly comprises a cylindrical body coaxially received in the second cylindrical chamber and a piston coaxially received in the cylindrical body;
   a cap covering the opening; and
   a valve housing cylindrically around the valve seat to cover the cap.

2. The pressure balance valve of claim 1, wherein the valve seat comprises a first circumferential wall, a second circumferential wall and an intermediate circumferential wall between the first and second circumferential walls, wherein a first hole between the first circumferential wall and the intermediate circumferential wall is configured to pass one of the liquids therethrough, and a second hole between the second circumferential wall and the intermediate circumferential wall is configured to pass the other of the liquids therethrough, wherein first and second holes are in communication with the second cylindrical chamber.

3. The pressure balance valve of claim 1, wherein the valve seat comprises a stop radially and inward protruding from a sidewall of the valve seat to abut against the balance valve assembly.

4. The pressure balance valve of claim 3, wherein the stop has a curve.

5. The pressure balance valve of claim 1, wherein the valve seat comprises a stop radially and inward protruding from a sidewall of the valve seat to abut against the cap.

6. The pressure balance valve of claim 5, wherein the stop has a curve.

7. The pressure balance valve of claim 1, wherein the valve seat is integrally formed.

8. The pressure balance valve of claim 1 further comprising a control head over the valve seat to cover the first cylindrical chambers, wherein the valve housing cylindrically around the control head.

9. The pressure balance valve of claim 8, wherein the control head is movable engagement with the valve seat.

10. The pressure balance valve of claim 8 further comprising a first sleeve in one of the first cylindrical chambers, radially in contact with an inner wall of said one of the first cylindrical chambers and in contact with the control head.

11. The pressure balance valve of claim 10 further comprising a second sleeve in the other of the first cylindrical chambers, radially in contact with an inner wall of said the other of the first cylindrical chambers and in contact with the control head.

12. The pressure balance valve of claim 1, wherein the two liquids comprise hot water and cold water respectively.

13. A pressure balance valve comprising:
a valve seat integrally formed with two first cylindrical chambers therein arranged in parallel and extending in a vertical direction, configured to pass two respective liquids therethrough, and a second cylindrical chamber therein extending in a horizontal direction vertical to the vertical direction, wherein an opening at a sidewall of the valve seat is aligned in the horizontal direction with the second cylindrical chamber;
a balance valve assembly coaxially received in the second cylindrical chamber, wherein the balance valve assembly comprises a cylindrical body coaxially received in the second cylindrical chamber and a piston coaxially received in the cylindrical body;
a cap covering the opening;
a control head over the valve seat to cover the first cylindrical chambers, wherein the control head is movable engagement with the valve seat; and
a valve housing cylindrically around the valve seat and the control head to cover the cap.

14. The pressure balance valve of claim 13, wherein the valve seat comprises a first circumferential wall, a second circumferential wall and an intermediate circumferential wall between the first and second circumferential walls, wherein a first hole between the first circumferential wall and the intermediate circumferential wall is configured to pass one of the liquids therethrough, and a second hole between the second circumferential wall and the intermediate circumferential wall is configured to pass the other of the liquids therethrough, wherein the first and second holes are in communication with the second cylindrical chamber.

15. The pressure balance valve of claim 13, wherein the valve seat comprises a stop radially and inward protruding from a sidewall of the valve seat to abut against the balance valve assembly.

16. The pressure balance valve of claim 15, wherein the stop has a curve.

17. The pressure balance valve of claim 13, wherein the valve seat comprises a stop radially and inward protruding from a sidewall of the valve seat to abut against the cap.

18. The pressure balance valve of claim 17, wherein the stop has a curve.

19. The pressure balance valve of claim 13 further comprising two sleeves in the two first cylindrical chambers respectively, radially in contact with inner walls of the two first cylindrical chambers respectively and in contact with the control head.

20. The pressure balance valve of claim 13, wherein the two liquids comprise hot water and cold water respectively.

\* \* \* \* \*